May 13, 1969 P. MALLERY 3,444,503
CONNECTOR FOR ELECTRICAL CIRCUIT BOARD
Filed June 7, 1967
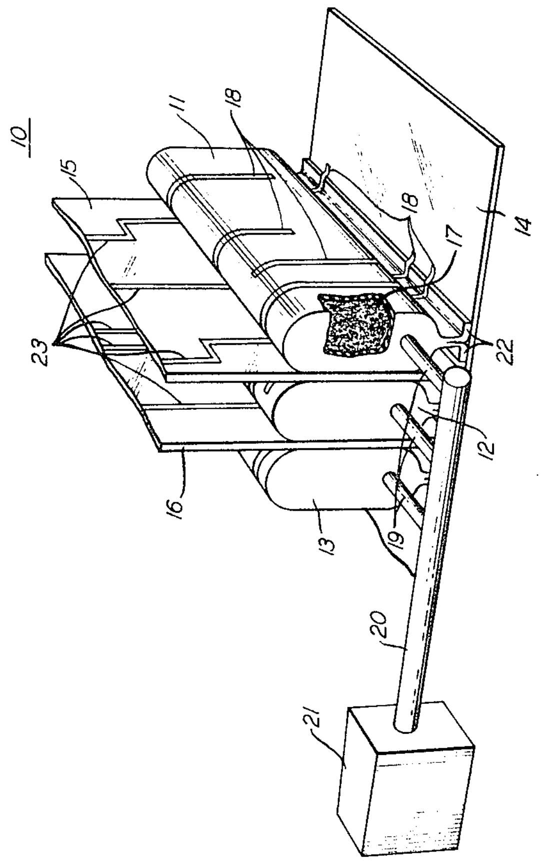
INVENTOR
P. MALLERY
BY [signature]
ATTORNEY United States Patent Office 3,444,503

Patented May 13, 1969

3,444,503

CONNECTOR FOR ELECTRICAL CIRCUIT BOARD

Paul Mallery, Murray Hill, N.J., assignor to Bell Telephone Laboratories, Incorporated, Murray Hill and Berkeley Heights, N.J., a corporation of New York Filed June 7, 1967, Ser. No. 644,356
Int. Cl. H01r *11/02, 3/02;* H05k *1/04*
U.S. Cl. 339—61 8 Claims

ABSTRACT OF THE DISCLOSURE

A terminal connector for a circuit board employs two hermetically sealed connector units each filled with a resilient material. The terminal connections for a circuit board with edge mounted strip terminals are effected by inserting the board between the units so that the terminals of the board are in registry with corresponding conductive strips on the units. Contact force is kept to a minimum during board insertion and withdrawal by evacuating the units through a vacuum line.

BACKGROUND OF THE INVENTION

*Field of the invention*

This invention relates to electrical circuit board terminal connectors and more particularly to such connectors which include means for adjusting contactor force.

*Description of the prior art*

One of the primary advantages of printed circuitry and more specifically of printed circuit boards is that it permits miniaturization through high circuit density. This advantage is not achieved without cost, however, because the greater the degree of miniaturization afforded by a printed circuit board, the more complex is the problem of providing interconnections with other printed circuit boards, terminals or associated circuitry. The problem is generally met in the prior art by arranging the terminal portions of the conductive strips of the printed circuitry in spaced-apart relation along one edge of the printed circuit board or card. The card is then typically inserted edgewise into some form of accommodating terminal arrangement that includes an array of resilient metal spring-like connectors that grip the board and bear conductively against corresponding ones of the board's terminal strips.

The designer of a terminal arrangement of the type described is faced with conflicting requirements. First, it is essential that the spring connectors grip the board with sufficient force to ensure both contact reliability and some measure of mechanical rigidity so that the board will remain in its assigned position. Secondly, it is essential that the spring connectors grip the board with a carefully limited force to ensure that board insertion and withdrawal may be accomplished with minimal risk to the connectors themselves, and further, with minimal risk to the terminal strips on the board. This latter risk is especially pronounced in the newer forms of circuit boards in which the conductive terminal strips tend to be exceedingly small in dimension both in thickness and in width. Obviously then, the designer must satisfy himself with some compromise level of board gripping force which is not optimum for either of the requirements indicated.

The problem of providing effective, reliable connectors is especially difficult to solve as the spacing between contacts is reduced. With a space of approximately 50 mils between the centers of adjacent connectors, it is practical to have individual contacts mounted in plastic housings. When this space is reduced to 25 mils or less, however, the physical size of the contacts of the connector and on the board are reduced to the point at which it is exceedingly difficult for them to withstand the strain of insertion and withdrawal imposed by even a minimal level of contact pressure.

A general object of the invention is to improve printed circuit board connectors, and a more specific object is to avoid the need for a design compromise of the type described.

SUMMARY OF THE INVENTION

The foregoing objects and related objects are achieved in accordance with the principles of the invention by providing a pair of connector units as a terminal means for a printed circuit board with spaced-apart edge mounted terminal strips. Each unit is fabricated from some suitable resilient sponge-like substance formed into a shape roughly resembling a pillow, and the units of each pair are placed side by side in touching or at least near-touching relation. The outside of each unit, which may be protected by a cover material, mounts conductive strips adapted for registration with the corresponding terminal strips of a circuit board when the board is inserted between the unit pair. The natural resilience of the connector units is sufficient to provide a firm gripping force that ensures proper fixed alignment and a high degree of connector reliability. This gripping force is too great however to avoid possible damage to the terminal strips of the board upon insertion or withdrawal. In accordance with the invention, the gripping force of the connector units may be selectively reduced to permit easy board insertion or withdrawal. The means for such reduction may comprise any suitable apparatus, such as a pump, for example, for partially evacuating the air that is entrapped within the hermetically sealed units. After evacuation, atmospheric pressure compresses the connector units to provide the desired reduction in holding force.

BRIEF DESCRIPTION OF THE DRAWING

The single figure is a sketch shown in perspective of a printed circuit board connector arrangement in accordance with the invention.

DETAILED DESCRIPTION

The connector arrangement 10 shown in the drawing includes three connector units 11, 12 and 13, providing accommodating terminations for the circuit boards 15 and 16. The key requirements for the construction of a connector unit in accordance with the invention are that it must be filled with some substance having the proper degree of resiliency, it must be covered with some substance that will provide a hermetically sealed enclosure and the covering must provide a suitable base for conductive strips. One illustrative combination meeting these requirements is employed in the construction of the connector unit 11 which includes an outer covering of Mylar tape, which is partially broken away to show the core portion 17 which may be polyurethane foam, for example. A covering of Kapton would be equally suitable. The connecting elements 18 are copper strips affixed to the outside of the Mylar tape covering. These copper strips 18 are in registry with the corresponding conducting paths 23 of the circuit boards 15 and 16.

Each of the units 11, 12 and 13 has its base 22 affixed to a common or mother circuit board 14 which provides supporting means, and interconnections if necessary, for the conducting paths 18. As shown, the units 11, 12 and 13 are placed together relatively closely so that without the boards 15 and 16 in place, the uints 11 and 13 are in touching relation with the center unit 12, or nearly so. Before the boards 15 and 16 are inserted into the positions shown, air is withdrawn from each of the units 11, 12 and 13 by means of the vacuum tubes 19, the common vacuum header 20 and the vacuum pump 21. As a result, a pressure differential is created between atmospheric pressure and the pressure inside of the uints 11, 12 and 13 which serves to reduce the size of the units slightly as they are compressed by the pressure differential indicated. The spaces between the units 11 and 12 and between 12 and 13, respectively, are increased in size and the boards 15 and 16 are easily inserted in place with no possible damage to the conductive strips 18.

With boards 15 and 16 in place as shown, air is permitted to re-enter the units 11, 12 and 13 through the vacuum tubes 19 and the full resilient force of the units 11, 12 and 13 comes into play in order to hold the boards 15 and 16 securely and to ensure contact reliability.

To withdraw the boards 15 and 16 the reverse procedure is followed. Sufficient air is evacuated from the units 11, 12 and 13 to reduce the internal pressure which frees the boards for easy removal.

In the prior art other printed circuit board terminal connecting arrangements are known which permit changing the contactor holding force. A system shown in U.S. Patent 3,243,762 issued to P. J. Tamburro Mar. 29, 1966 and a system employed by the commercially known Preskam connector of the Cinch Company are illustrative. In such systems, however, the use of a mechanical tool is typically required in close proximity to the plug-in board or card thus exposing the card to the possibility of mechanical damage. Additionally, such systems normally require a displacement of the circuit boards, assuming that the boards are arranged in tandem, whenever the mechanical pressure of the contacts is changed. In a system in accordance with the invention, however, the vacuum line can be controlled from a remote point. The problem of tools in proximity to the plug-in board is eliminated and the vacuum operated units can be mounted without regard to the accessibility of tools. Any number of vacuum operated connectors can be operated by a single control. Additionally, each contact unit contracts upon itself and, as a result, no movement of the plug-in board is required.

It is to be understood that the embodiment described herein is merely illustrative of the principles of the invention. Various modifications thereto may be effected by persons skilled in the art without departing from the spirit and scope of the invention.

What is claimed is:

1. Apparatus providing conductive terminal connections for the multiple edge mounted terminal leads of a printed circuit board comprising, in combination, an adjacent pair of hermetically sealed connector units each including an interior resilient pad, conductive strips affixed to the outside of said units adapted for registration and electrical contact with corresponding ones of said terminal leads, and means for reducing the air pressure within said units thereby to increase the space between said units to permit relatively easy insertion or withdrawal of said board from between said units.

2. Apparatus in accordance with claim 1 wherein said resilient pad comprises polyurethane.

3. Apparatus in accordance with claim 1 wherein said units are covered with Kapton.

4. Apparatus in accordance with claim 1 wherein said units are supportably positioned on a mounting board having conductive paths thereon connected to corresponding ones of said conductive strips.

5. Apparatus in accordance with claim 1 wherein said reducing means comprises a vacuum pump and an evacuating line connecting each of said units to said pump.

6. Apparatus providing conductive terminal connections for the multiple edge mounted terminal leads of a printed circuit board comprising, in combination, a pair of adjacent resilient pads mounted sufficiently closely to require a substantial force to insert said board between said pads when said pads are in a normal condition, said pads mounting a plurality of conductive strips arranged for alignment and contact with said terminal leads of said board when said board is positioned between said pads, and means for markedly reducing the magnitude of said substantial force thereby to permit relatively easy insertion and withdrawal of said board into or from the area between said pads, said reducing means comprising a means for partially evacuating the air from said pads, said pads being hermetically sealed with an outer covering.

7. Apparatus in accordance with claim 6 wherein said covering comprises Mylar.

8. Apparatus in accordance with claim 6 wherein said pads comprise a plastic sponge-like material.

References Cited

UNITED STATES PATENTS

| | | | |
|---|---|---|---|
| 2,685,071 | 7/1954 | McCreary | 339—35 |
| 2,978,666 | 4/1961 | McGregor | 339—17 |
| 3,366,916 | 1/1968 | Oktay | 339—74 |

OTHER REFERENCES

R. Abbatecola, IBM Technical Disclosure Bulletin, July 1966, p. 142.

RICHARD E. MOORE, *Primary Examiner.*

J. H. McGLYNN, *Assistant Examiner.*

U.S. Cl. X.R.

339—17, 74, 117